United States Patent
Tamai et al.

(10) Patent No.: US 9,417,115 B2
(45) Date of Patent: Aug. 16, 2016

(54) COMBINATION WEIGHING DEVICE WITH IMAGING SYSTEM

(71) Applicant: ISHIDA CO., LTD., Kyoto-shi, Kyoto (JP)

(72) Inventors: Yutaka Tamai, Ritto (JP); Hideshi Miyamoto, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 52 days.

(21) Appl. No.: 14/384,349

(22) PCT Filed: Feb. 20, 2013

(86) PCT No.: PCT/JP2013/054203
§ 371 (c)(1),
(2) Date: Sep. 10, 2014

(87) PCT Pub. No.: WO2013/136933
PCT Pub. Date: Sep. 19, 2013

(65) Prior Publication Data
US 2015/0021103 A1 Jan. 22, 2015

(30) Foreign Application Priority Data
Mar. 16, 2012 (JP) .................................. 2012-060243

(51) Int. Cl.
*G01G 19/387* (2006.01)
*G01G 19/393* (2006.01)

(52) U.S. Cl.
CPC ............ *G01G 19/387* (2013.01); *G01G 19/393* (2013.01)

(58) Field of Classification Search
CPC .......................... G01G 19/387; G01G 19/393
See application file for complete search history.

(56) References Cited

U.S. PATENT DOCUMENTS

| | | | | |
|---|---|---|---|---|
| 5,270,495 A | * | 12/1993 | Mosher | G01G 13/026 177/25.18 |
| 5,753,866 A | | 5/1998 | Ikeda et al. | |
| 2004/0201587 A1 | | 10/2004 | Mizusawa | |

FOREIGN PATENT DOCUMENTS

| | | |
|---|---|---|
| CN | 101576398 A | 11/2009 |
| CN | 101881647 A | 11/2010 |
| JP | 2001-343294 A | 12/2001 |
| JP | 2002-206963 A | 7/2002 |
| JP | 3325897 B | 9/2002 |
| JP | 2003-256874 A | 9/2003 |
| JP | 2005-121512 A | 5/2005 |
| JP | 2010-078491 A | 4/2010 |
| WO | 95-31702 A1 | 11/1995 |

* cited by examiner

*Primary Examiner* — Randy W Gibson
(74) *Attorney, Agent, or Firm* — Global IP Counselors, LLP

(57) ABSTRACT

A combination weighing device includes a dispersing table, a plurality of radial feeders, a plurality of cameras, an image processing unit, and a touch panel. The dispersing table receives a supply of a large number of articles and disperses the articles. The radial feeders are arranged to extend radially from the dispersing table, receive the articles dispersed by the dispersing table, and convey the articles in a direction away from the dispersing table. The cameras are disposed at a position other than a space directly above the dispersing unit and capture images of the dispersing table and the radial feeders. The image processing unit generates a projection plan view image of the dispersing table and the radial feeders by synthesizing the images captured by the cameras. The touch panel outputs the plan view image.

15 Claims, 8 Drawing Sheets

COMBINATION WEIGHING DEVICE WITH IMAGING SYSTEM

TECHNICAL FIELD

The present invention relates to a combination weighing device configured to perform a combination calculation of a weighing value of a plurality of articles.

BACKGROUND ART

In a conventional configuration, a combination weighing device is provided with a camera to confirm a status of a dispersing unit and a feeder that receive a supply of articles. For example, Patent Literature 1 (Japanese Patent No. 3325897) discloses a configuration in which a camera is provided directly above the dispersing unit (dispersing feeder), in a direction along a periphery of the feeder (drive feeder), and in an obliquely upward direction with reference to the dispersing unit and the feeder.

Generally, a control panel (control unit) that is configured to control the combination weighing device is typically disposed in a position that is away from the dispersing unit and the feeder. Therefore, in particular, if a camera is disposed directly above the dispersing unit as disclosed in Patent Literature 1 and an operator in proximity to the control panel can view an image looking down on the dispersing unit and the feeder, it is convenient for the operator since the operator can perform operations on the control panel while easily grasping the status of the dispersing unit and the feeder.

SUMMARY OF THE INVENTION

Technical Problem

However, in an actual implementation, it is difficult to install a camera directly above the dispersing unit in most cases in terms of preventing the mixing of foreign substances into the articles. Furthermore, it is often the case that a camera cannot be installed directly above the dispersing unit due to problems associated with the ceiling height of a building in which the combination weighing device is installed or the like. In addition, since a supply conveyor for conveying the articles to the dispersing unit or the like is provided directly above the dispersing unit, the supply conveyor or the like tends to generate a dead angle of the camera such that portions of the supply conveyor are not in a direct line-of-sight relative to the lens of the camera.

On the other hand, it is often the case that a status of the dispersing unit and the feeder can be captured with a camera from an obliquely upward direction or a horizontal direction relative to the dispersing unit and the feeder. Although it is possible to grasp the general status of dispersing and conveying of the articles from such images, it is difficult for the operator to grasp instinctively the conveyance amount of articles or the like. That is to say, it is uncertain whether the operator can obtain sufficient information when using an image of the dispersing unit and the feeder captured from a horizontal direction or obliquely upward direction.

The problem of the invention is to provide a combination weighing device that facilitates comprehension of the status of a dispersing unit and feeders of the combination weighing device in a case where it is difficult to dispose a camera looking down on the dispersing unit and the feeders directly above the dispersing unit.

Solution to Problem

A combination weighing device according to the present invention includes a dispersing unit, a plurality of radial feeders, a plurality of cameras, a processing unit, and an output unit. The dispersing unit receives a supply of a large number of articles and disperses the articles. The radial feeders are arranged to extend radially from the dispersing unit. The radial feeder receives the articles dispersed by the dispersing unit and conveys the articles in a direction away from the dispersing unit. The cameras are disposed at a position other than a space directly above the dispersing unit. The cameras capture images of the dispersing unit and the radial feeders. The processing unit generates a plain view image of the dispersing unit and the radial feeders by synthesizing the images captured by the cameras. The output unit outputs the plain view image.

In this context, the combination weighing device includes a plurality of cameras which capture images of the dispersing unit and the radial feeders from a space other than directly above the dispersing unit. A plain view image of the dispersing unit and the radial feeders is generated by synthesizing (electronically manipulating) the images captured by the camera and is the manipulated plain view image is outputted. Since the plain view image of the dispersing unit and the radial feeders is outputted, it is possible for an operator to accurately comprehend the status of the dispersing unit and the feeders in real time even in a case where it is difficult to dispose cameras into a space directly above the dispersing unit. As a result, when abnormality occurs, it is easy for the operator to presume the cause of the abnormality based on the plain view images and to take a required response immediately.

In addition, when a dead angle is generated in an image captured by one camera due to obstacles such as the supply conveyor of the articles, it is easy to comprehend the status of the dispersing unit and the radial feeders without being affected by the obstacles since the plain view image is generated by synthesizing images captured by a plurality of cameras.

Furthermore, preferably, the combination weighing device according to the present invention further includes a setting unit. The setting unit preferably performs settings, based on the images captured by the cameras in a first period, for generation of the plain view image with the images captured by the cameras by the processing unit in a second period.

In this context, the setting unit performs settings for generation of the plain view image based on the images captured by the cameras in the first period (during initial settings, during maintenance, or the like). That is to say, even when camera positions are changed, a plain view image can be generated based on the camera images captured at those positions in the first period. As a result, camera installation positions can be varied according to the site conditions. That is to say, even when there is a restriction on the camera installation positions, the plain view image of the dispersing unit and the radial feeders can be easily obtained.

Furthermore, preferably the combination weighing device according to the present invention further includes an input unit. The setting unit preferably performs the settings based on reference point information input to the input unit.

In this context, the reference point information from the input unit enables accurate execution of the settings for generation of a plain view image. As a result, an accurate plain view image can be easily obtained.

Furthermore, it is preferred that the output unit of the combination weighing device according to the present invention outputs operational status of the dispersing unit and/or the radial feeders at the same time as the plain view image.

In this context, since the plain view image and the operational status of the dispersing unit and/or the radial feeders are displayed at the same time, it is comprehendible whether the dispersing unit and/or the radial feeders are operated suitably in a single screen. As a result, for example, when abnormality occurs, it is easy for the operator to determine appropriate measures to solve that.

Furthermore, it is preferred that the output unit outputs the operational status of the dispersing unit and/or each of the radial feeders at a position corresponding to the dispersing unit and/or each of the radial feeders in the plain view image.

In this context, convenience of the operators is improved since it is easy to comprehend the plain view image and the operational status of the dispersing unit and/or each of the radial feeders in association with each other.

Furthermore, preferably, the combination weighing device according to the present invention further includes a plurality of weighing units and a calculating unit. Preferably, the weighing units are disposed respectively below an end portion on a forward side of the radial feeders in the direction away from the dispersing unit and receive the articles from the radial feeders and weigh the received article. The calculating unit preferably calculates a conveyance amount by each of the radial feeders based on a weighing result of the weighing units. The output unit preferably outputs a calculation result of the calculation unit at the same time as the plain view image.

In this context, the conveyance amount of the dispersion feeder is displayed together with the plain view image. As a result, the operator can easily comprehend the plain view image and the conveying status of the dispersion feeder in association with each other. As a result, for example, when abnormality occurs, it is easy for the operator to determine appropriate measures to solve that.

Furthermore, the output unit preferably outputs the calculation result related to each of the radial feeders at a position corresponding to each of the radial feeders in the plain view image.

In this context, convenience of the operators is improved since it is easier to comprehend the plain view image and the conveyance amount of the dispersion feeder in association with each other.

It is preferred that a code enabling identification of each of the radial feeders is respectively applied to the radial feeders. Preferably, the output unit outputs the code at the same time as the plain view image at a position corresponding to each of the radial feeders in the plain view image.

In this context, since the code enabling identification of the radial feeder is simultaneously displayed at the position corresponding to each of the radial feeders in the plain view image, it is possible to comprehend accurately which radial feeder has a problem from the plain view image.

It is preferred that the output unit outputs the plain view image rotated in-plane around a rotational center being a centroid of the dispersing unit in the plain view image.

In this context, the operator can rotate the plain view image and output it in a configuration that is most easily comprehended. As a result, erroneous comprehension of the plain view image by the operator can be prevented.

Furthermore, preferably, the combination weighing device according to the present invention further includes a support unit. The support unit preferably supports the dispersing unit, the radial feeders and the cameras. The cameras are preferably disposed above the support unit and in a space other than directly above the radial feeders. More specifically, the cameras are located at opposite lateral sides of the radial feeders facing one another such that one camera can view areas that are within the dead angle of the other camera.

In this context, since the cameras are disposed above the support unit, the cameras do not obstruct works or passage of the operator. It is often the case that a work passage for the operator is disposed on a periphery of the combination weighing device. However, when the cameras are disposed above the support unit of the combination weighing device, there is little effect on works or passage of the operator. Furthermore, accidents such as the operator being injured by collision with the cameras can be prevented.

In addition, the cameras preferably have a lens having a horizontal angle of view of at least 90 degrees (a wide angle lens).

In this context, even when the cameras are disposed in proximity to the object to be imaged (above the support unit), the images required for generating the plain view image of the dispersing unit and the radial feeders can be obtained with a small number of cameras, and therefore the installation costs associated with the cameras can be minimized.

Advantageous Effects of Invention

The combination weighing device according to the present invention includes a plurality of cameras which capture images of the dispersing unit and the radial feeders from a space other than directly above the dispersing unit. A plain view image of the dispersing unit and the radial feeders is generated by synthesizing the images captured by the cameras and is outputted. Since the plain view image of the dispersing unit and the radial feeders is outputted, it is possible for the operator to accurately comprehend the status of the dispersing unit and the feeders in real time even in a case where it is difficult to dispose the cameras into a space directly above the dispersing unit.

DESCRIPTION OF EMBODIMENTS (1) Overall Configuration

Figure 1:
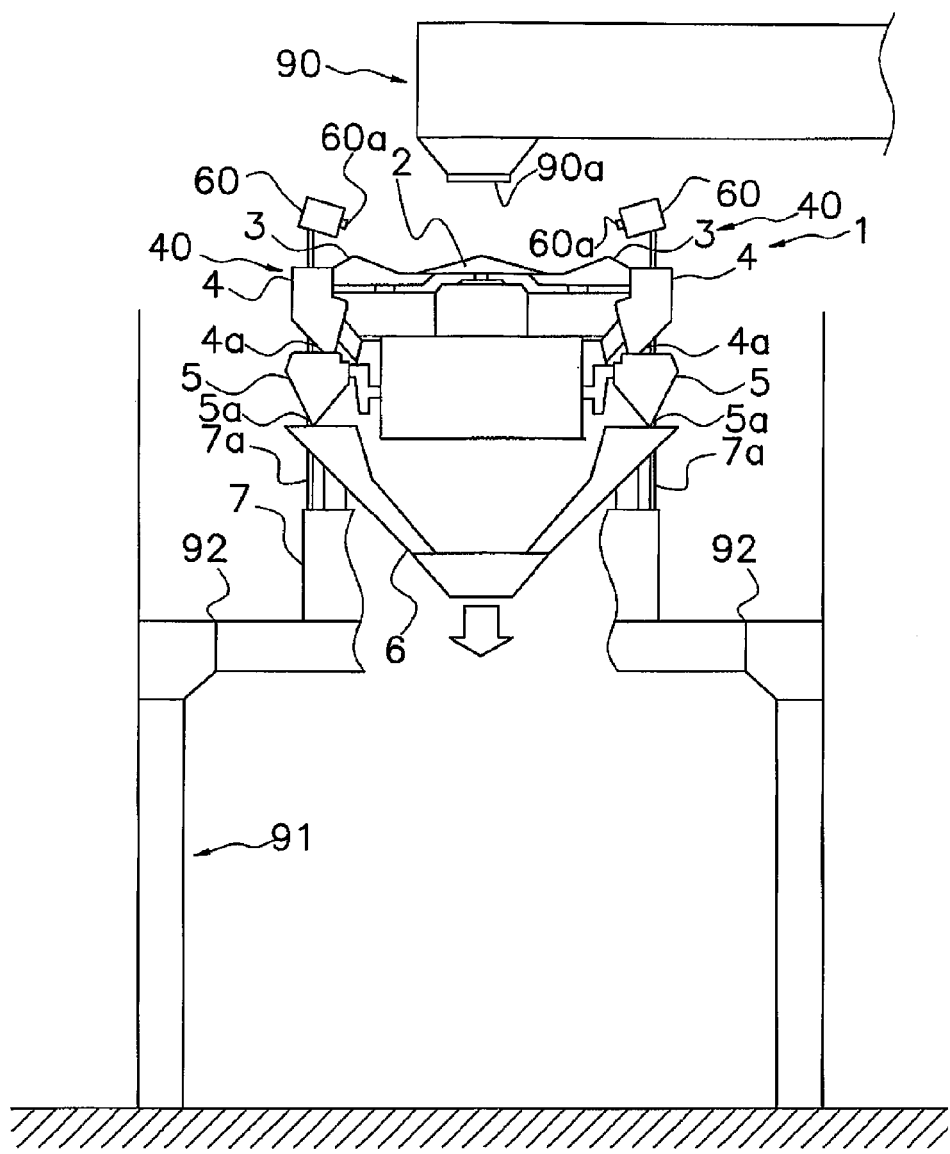
FIG. 1 is a vertical sectional schematic view of a combination weighing device according to a first embodiment of the present invention.

FIG. 1 describes a combination weighing device 1 according to an embodiment of the present invention. The combination weighing device 1 performs a combination calculation of weighing values of articles in a plurality of weighing hoppers 5, selects a combination of the articles in which the result of the combination calculation takes a value that falls within a predetermined permissible range, and discharges articles in the weighing hopper 5 that are included in the combination out of the combination weighing device 1.

The combination weighing device 1 is installed on a frame 91 to be thereby disposed above a packaging device or the like (not illustrated). A work passage 92 is provided on the all sides of the combination weighing device 1 to enable an operator to access to the combination weighing device 1 when abnormality occurs, maintenance is required or the like.

The combination weighing device 1 includes a dispersing table 2, fourteen heads 40, a collection discharge chute 6, a touch panel 10, a control unit 30, and two cameras 60. The number of heads 40 is merely exemplary, and there is no limitation in this regard.

Figure 2:
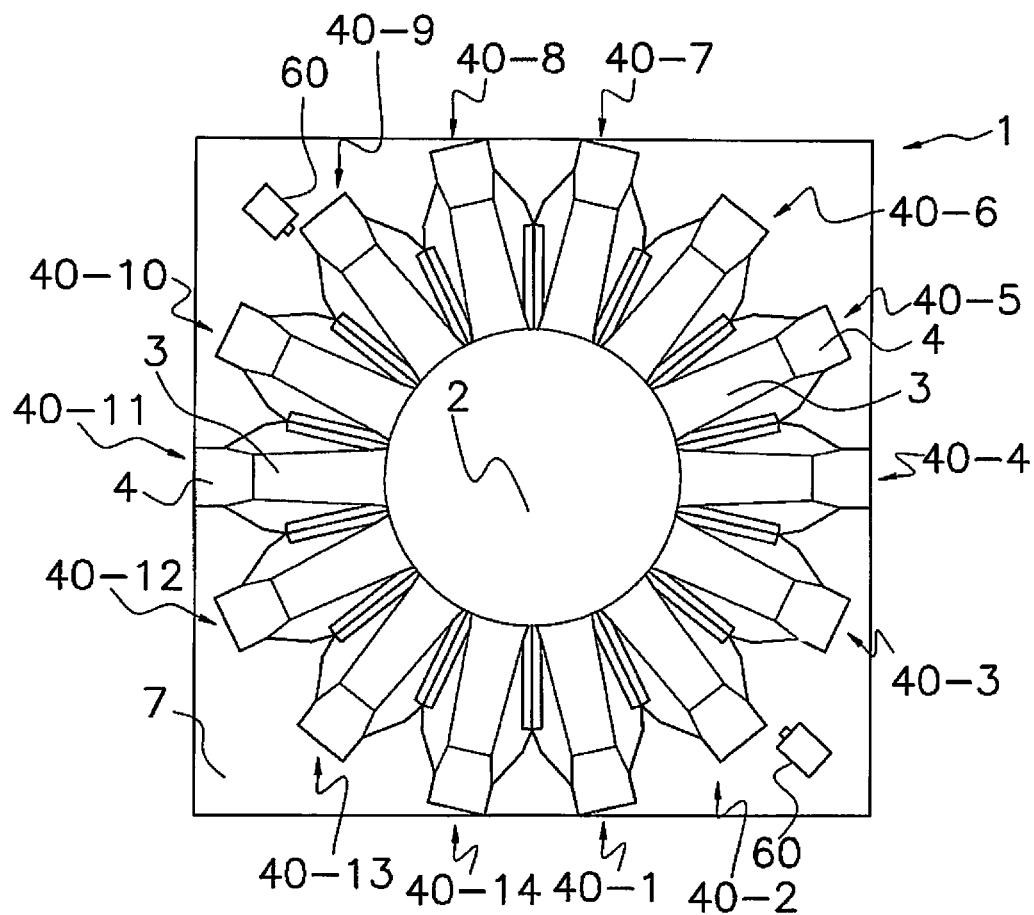
FIG. 2 is a schematic plain view of the combination weighing device. A portion of reference signs for radial feeders and pool hoppers are omitted in the figure.

As illustrated in FIG. 2, the heads 40 are disposed annularly about the dispersing table 2 when viewed in plan. The heads 40 have codes 1 to 14 attached thereto to thereby enable identification. As illustrated in FIG. 2, each of the heads 40-1 through 40-14 (hereinafter abbreviated as 40-1~14) is disposed so that the numbers of codes increase in a counterclockwise direction. The respective heads 40 includes a radial feeder 3, a pool hopper 4 and a weighing hopper 5. The radial feeder 3, the pool hopper 4 and the weighing hopper 5 belonging to each of the heads 40-1~14 have, as the code, the numbers 1 through 14 are sequentially attached to each of the heads 40-1~14 in order to enable identification. However, the numbers have been omitted in the drawings for the sake of clarity.

(2) Detailed Configuration (2-1) Dispersing Table

The dispersing table 2 is a member in the shape of a flat cone-shaped table. The dispersing table 2 receives articles that are objects to be weighed from the supply conveyor 90 above the dispersing table 2. The dispersing table 2 is vibrated by an electromagnet (not illustrated) to convey the articles received from the supply conveyor 90 in a radial direction while dispersing the articles in a circumferential direction and to supply the articles to the radial feeders 3. The dispersing table 2 is an example of the dispersing unit.

The amount of the articles conveyed from the dispersing table 2 to the radial feeder 3 is mainly controlled by a vibration strength of the dispersing table 2. The vibration strength of the dispersing table 2 is a value related to an amplitude of a vibration of the dispersing table 2 that is generated with the electromagnet (not shown) provided in the dispersing table 2 by a vibrating unit 35*a* of the control unit 30 described below. The initial setting value for the vibration strength of the dispersing table 2 is stored in a storing unit 34 of the control unit 30 as described below. The operator can update the vibration strength of the dispersing table 2 stored in the storing unit 34 by using the touch panel 10 as described below.

(2-2) Radial Feeders

The radial feeders 3 are arranged to extend radially around the dispersing table 2. The radial feeders 3 receive articles dispersed by the dispersing table 2. The respective radial feeders 3-1~14 are vibrated by an electromagnet (not illustrated) to convey the articles in a radial direction towards an outer edge of each of the radial feeders 3-1~14. That is to say, each of the radial feeders 3-1~14 conveys the articles in a direction away from the dispersing table 2. The articles conveyed by each radial feeder 3-1~14 are supplied to the pool hopper 4-1~14 that is disposed below the outer edge side of each of the radial feeders 3-1~14.

The amount of the articles conveyed by each of the radial feeders 3-1~14 is mainly controlled by a vibration strength and a vibration time of each of radial feeders 3-1~14. The vibration strength of the radial feeder 3 is a value related to an amplitude of a vibration of the radial feeder 3 that is generated with the electromagnet (not shown) provided in the radial feeder 3 by the vibrating unit 35*a* of the control unit 30 as described below. The vibration time is a time for one cycle from when the vibrating unit 35*a* of the control unit 30 described below starts vibration the radial feeder 3 to when the vibrating unit 35*a* stops the vibration. The initial setting values of the vibration strength and the vibration time of each of the radial feeders 3-1~14 are stored in the storing unit 34 of the control unit 30 described below. The operator can update the vibration strength and the vibration time of each of the radial feeders 3-1~14 stored in the storing unit 34 by using the touch panel 10 described below.

(2-3) Pool Hoppers

Each pool hopper (PH) 4-1~14 is disposed below the outer edge side of each of the radial feeder 3-1~14 of the head 40-1~14 to which that pool hopper 4-1~14 belongs. Each of the pool hoppers (PH) 4-1~14 temporary stores the articles that are supplied from the radial feeders 3-1~14 disposed thereabove.

Figure 3:
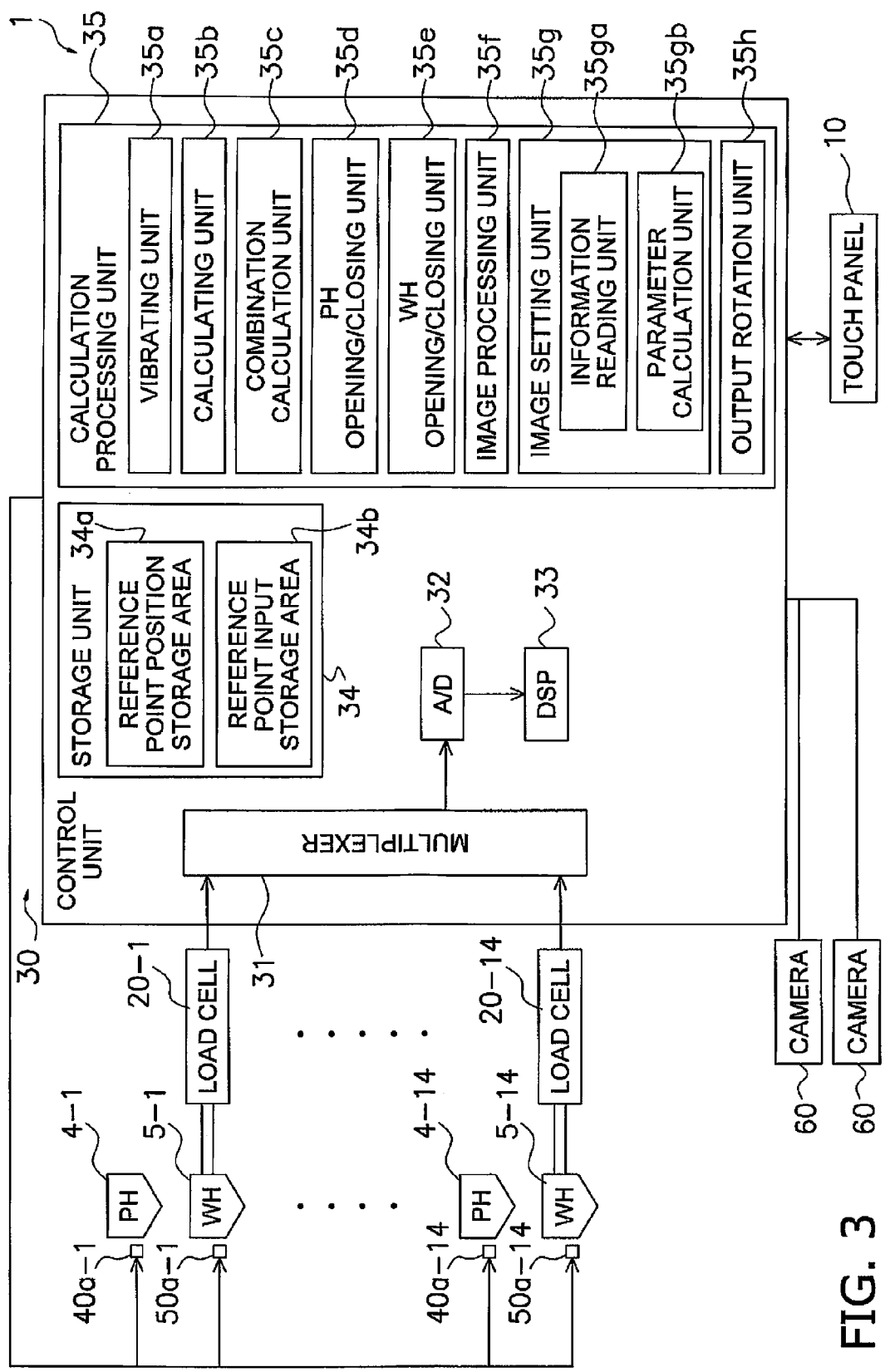
FIG. 3 is a control block diagram of the combination weighing device.

The pool hoppers 4 includes a PH gate 4*a* at a lower portion thereof. When the PH gate 4*a* opens, the articles are supplied to the weighing hopper 5 disposed below the pool hopper 4. The PH gate 4*a* is opened and closed by operation of a link mechanism (not illustrated) with a stepping motor 40*a*-1~14 as illustrated in FIG. 3. The stepping motor 40*a*-1~14 is operated by a command from a PH opening/closing unit 35*d* of the control unit 30 described below. The opening and closing operation of each of PH gates 4*a* is not operably connected to an opening and closing operation of another PH gate 4*a*. That is to say, the opening and closing operation of each of the PH gates 4*a* is independent.

(2-4) Weighing Hoppers

The weighing hopper (WH) is an example of a weighing unit. Each of the weighing hoppers 5-1~14 is disposed directly below each of the pool hoppers 4-1~14 of the head 40-1~14 to which the weighing hopper 5-1~14 belongs. That is to say, the weighing hopper 5-1~14 is disposed below the outer edge side of the radial feeder 3-1~14. Each of the weighing hoppers 5-1~14 weighs the weight of articles supplied by the pool hoppers 4-1~14, that is to say, the weight of articles supplied from the radial feeder 3-1~14 via the pool hoppers 4-1~14 with a load cell 20-1~14 as illustrated in FIG. 3.

The weighing hopper 5 includes a WH gate 5*a* at a lower portion thereof. The WH gate 5*a* is opened and closed by operation of a link mechanism (not illustrated) with a stepping motor 50*a*-1~14 as illustrated in FIG. 3. The stepping motor 50*a*-1~14 is operated by a command from a WH opening/closing unit 35*e* of the control unit 30 described below. The opening and closing operation of each of WH gates 5*a* is not operably connected to an opening and closing operation of another WH gate 5*a*. That is to say, the opening and closing operation of each of WH gates 5*a* is independent.

The load cell 20-1~14 illustrated in FIG. 3 weighs the articles retained in each of weighing hoppers 5-1~14. The weighing result of the articles by the load cell 20-1~14 is outputted as a weighing signal. The weighing signal is sent as required through an amplifier (not illustrated) to a multiplexer 31 of the control unit 30 described below. The load cell 20-1~14 is a load cell that is provided with a strain gauge such as disclosed in Japanese Patent Application Laid-Open No. 2001-343294 whereby displacement of the strain body, which includes a movable portion and a fixed portion, associated with the loading weight is detected by changes in the resistance of the strain gauge and the detection result is sent as a weighing signal to the multiplexer 31.

(2-5) Collection Discharge Chute

The collection discharge chute 6 collects the articles that are supplied from the weighing hoppers 5 and discharges the articles out of the combination weighing device 1. The discharged articles are supplied to a packaging device or the like (not illustrated) that is disposed below the collection discharge chute 6.

(2-6) Control Unit

As illustrated in FIG. 3, the control unit 30 includes a CPU, a storing unit 34, a multiplexer 31, an A/D converter 32, a digital signal processor (DSP) 33, or the like. The storing unit 34 is configured by a ROM, a RAM, or the like.

In the control unit 30, the CPU, which performs control, reads programs stored on the storing unit 34 and executes various control operations as a calculation processing unit 35. As illustrated in FIG. 3, the calculation processing unit 35 functions as a vibrating unit 35*a*, a calculating unit 35*b*, a combination calculation unit 35*c*, a PH (pool hopper) opening/closing unit 35*d*, a WH (weighing hopper) opening/closing unit 35*e*, an image processing unit 35*f*, an image setting unit 35*g*, and an output rotation unit 35*h*.

(2-6-1) Multiplexer

The multiplexer 31 selects a weighing signal from the weighing signals from the load cells 20-1~14 in accordance with the command from the DSP 33 described below and sends the signal to the A/D converter 32.

(2-6-2) A/D Converter

The A/D converter 32 converts the weighing signal that is an analog signal received from the multiplexer 31 to a digital signal in accordance with the timing signal sent from the DSP 33 and sends the digital signal to the DSP 33.

(2-6-3) DSP

The DSP 33 executes filter processing of the digital signal sent from the A/D converter 32. The weighing signal after the filter processing is sent to the calculating unit 35*b* described below, and is then stored in the storing unit 34 as the weight (measurement value) of the articles retained in the weighing hopper 5 for each of the weighing hoppers 5.

(2-6-4) Storing Unit

The storing unit 34 stores programs to be read and executed by the CPU and various types of information and data or the like required for calculation processing. The storing unit 34 includes a reference point position storage area 34*a* and a reference point input storage area 34*b*.

(2-6-4-1) Reference Point Position Storage Area

The reference point position storage area 34*a* stores three dimensional position information of reference points used by the image setting unit 35*g* described below. The information stored in the reference point position storage area 34*a* is read out by an information reading unit 35*ga* of the image setting unit 35*g* when the image setting unit 35*g* derives parameters which are used by the image processing unit 35*f* for generating a plain view image 101.

Figure 4:
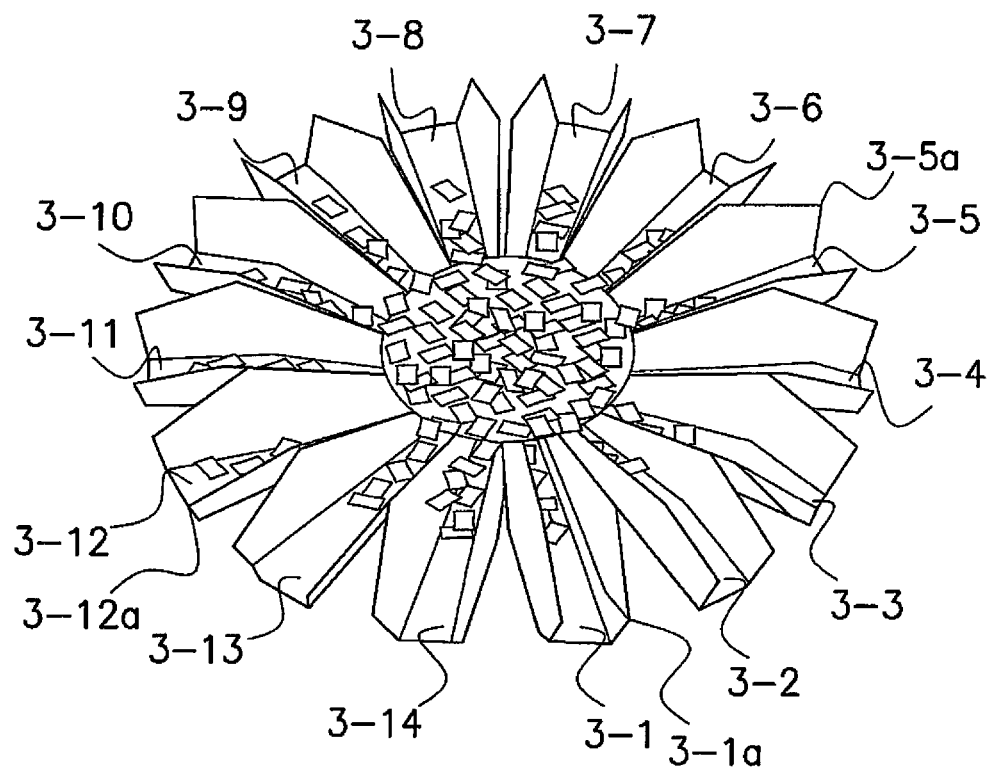
FIG. 4 is a schematic view illustrating an example of images captured by cameras. The image captured by the cameras is a moving image. In the present figure, only the image of a portion of the dispersing unit and the radial feeders is illustrated.

The reference points are predetermined sections of the combination weighing device 1, and denote the points for which three dimensional position information is recorded as an initial value, specifically in this context, denotes the corner parts (for example, the corner parts 3-1*a*, 3-5*a*, 3-12*a*, or the like in FIG. 4) on the outer edge side of the radial feeder 3.

(2-6-4-2) Reference Point Input Storage Area

The reference point input storage area 34*b* stores two dimensional position information for the reference points in relation to the captured image of the camera 60. The two dimensional position information of the reference points in relation to the captured image of the camera 60 is reference point information, and is input from the touch panel 10. The information stored in the reference point input storage area 34*b* is read out by the information reading unit 35*ga* when the image setting unit 35*g* derives parameters which are used by the image processing unit 35*f* for generating the plain view image 101.

The two dimensional position information of the reference points in relation to the captured image of the camera 60 is the position information of the reference points in the captured image of the camera 60 displayed on the touch panel 10 as illustrated for example in FIG. 4.

(2-6-5) Calculation Processing Unit (2-6-5-1) Vibrating Unit

The vibrating unit 35*a* controls conveyance of the articles by the dispersing table 2 and the radial feeder 3 by controlling the vibration of the dispersing table 2 and the radial feeder 3.

Specifically, the vibrating unit 35*a* vibrates the dispersing table 2 and the radial feeders 3 by intermittently generating an electromagnetic force with the electromagnet (not illustrated) disposed below the dispersing table 2 and each of the radial feeders 3. The vibrating unit 35*a* performs vibration control by using the vibration strength of the dispersing table 2 and the radial feeders 3-1~14 and the vibration time of the radial feeder 3-1~14 stored in the storing unit 34. As a result, a predetermined amount of the articles is conveyed on the dispersing table 2 to the radial feeder 3 outwardly in a radial direction while being dispersed in circumferential direction of the dispersing table 2. A predetermined amount of articles is conveyed on each of the radial feeders 3-1~14 in a direction toward the outer edge of the radial feeders 3-1~14 to the pool hoppers 4-1~14.

The vibrating unit 35*a* controls the start and the stop of each of the radial feeders 3-1~14 separately. That is to say, the vibrating unit 35*a* vibrates the respective radial feeders 3-1~14 and conveys the articles only when the pool hoppers 4-1~14 of the head 40-1~14 to which the radial feeder 3-1~14 belongs is empty.

(2-6-5-2) Calculating Unit

The calculating unit 35*b* receives a weighing signal to which filter processing is applied by the DSP 33 from each of the load cells 20-1~14 separately. The weighing signal for each of the load cells 20-1~14 is stored in the storing unit 34 as a weight value (measurement value) of the articles in the weighing hopper 5-1~14 to which each of the load cells 20-1~14 is provided.

The calculating unit 35*b* performs processing of the calculation of the conveyance amount for each of the radial feeders 3-1~14. In this context, the conveyance amount is calculated as an average value of the amount of the articles conveyed by the radial feeder 3-1~14. More specifically, the calculating unit 35*b* calculates an average value of the weight values acquired from the filter processed weighing signals of the load cells 20-1~14 for each of the weighing hoppers 5-1~14 (for each of the load cells 20-1~14) and stores the average value in the storing unit 34 as a conveyance amount of the radial feeders 3-1~14 of the heads 40-1~14 to which that weighing hopper 5-1~14 belongs.

The calculation method for the conveyance amount described above is merely exemplary, and the calculating unit 35*b* may calculate the every weight value acquired from the filter processed weighing signals of the load cells 20-1~14 as the conveyance amount in substitution for calculating the average of the conveyance amount.

(2-6-5-3) Combination Calculation Unit

The combination calculation unit 35c uses a combination calculation program stored in the storing unit 34 to perform combination calculations. More specifically, the combination calculation unit 35c performs a combination calculation so that the total of the weight values falls within a predetermined target weight range based on the weight value of the articles for each of the weighing hoppers 5-1~14 that is stored in the storing unit 34. Furthermore, a plurality of weighing hoppers 5-1~14 are selected based on the result of the combination calculation. The information in relation to the weighing hoppers 5-1~14 selected in the combination is sent to the WH opening/closing unit 35e. From data of the weight values of the articles stored in the storing unit 34, the data of the weight values of the weighing hoppers 5-1~14 selected in the combination is reset.

(2-6-5-4) PH Opening and Closing Unit

When one of the weighing hoppers 5-1~14 is empty, the PH opening/closing unit 35d operates the stepping motor 40a-1~14 to open the PH gate 4a of the pool hopper 4-1~14 disposed above that weighing hopper 5-1~14 Thereafter, the stepping motor 40a-1~14 is operated again to close the PH gate 4a.

(2-6-5-5) WH Opening and Closing Unit

The WH opening/closing unit 35e receives information of a combination of the weighing hoppers 5-4~14 selected by the combination calculation from the combination calculation unit 35c and operates the stepping motors 50a-1~14 to open the WH gates 5a of the weighing hoppers 5-4~14 included in the selected combination. Thereafter, the stepping motor 50a-1~14 is operated again to close the WH gate 5a.

(2-6-5-6) Image Processing Unit

Figure 5:
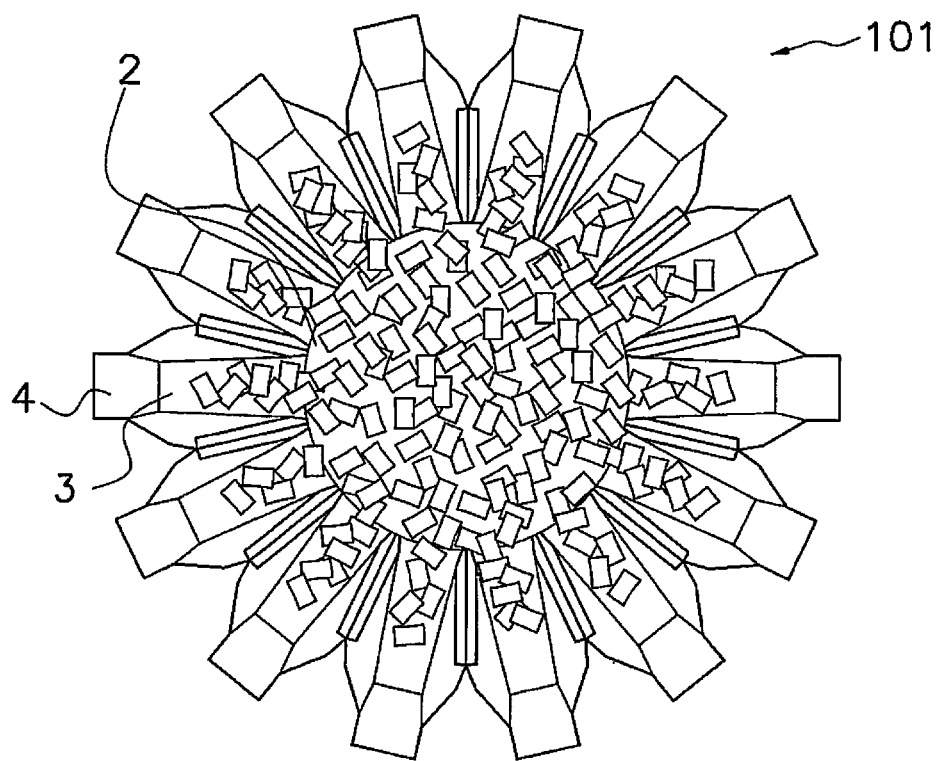
FIG. 5 illustrates an example of plain view images generated by an image processing unit. The plain view image is a moving image. A portion of reference signs for heads, the radial feeders and the pool hoppers are omitted in the figure.

The image processing unit 35f synthesizes the images (moving images) captured by the two cameras 60 from the obliquely upward direction of the dispersing table 2 and the radial feeders 3 as shown in FIG. 4 and thereby generates a plain view image 101 (moving image), as illustrated in FIG. 5, in which the dispersing table 2 and the radial feeders 3 are viewed from above the central portion of the dispersing table 2. The plain view image 101 is displayed on the touch panel 10 described below.

As illustrated in FIG. 4, in the image of the camera 60 from above the dispersing table 2 and the radial feeders 3 at an oblique angle, there is a dead angle where surfaces of several of the radial feeders 3 obscure portions of the article receiving area therein. However, the plain view image 101 without a dead angle is obtained by synthesizing the images captured by a plurality of the cameras 60 (two cameras in the present embodiment) making a composite or projection view.

The generation of the plain view image 101 is performed for example using the following principle.

Firstly, coordinate conversion of the image captured by the cameras 60 is performed to generate a projection image projected onto a virtual horizontal plane. Next, coordinate conversion of the projection image is performed to generate an upper viewpoint image seen from a virtual camera (a virtual camera positioned above the center portion of the dispersing table 2). The plain view image 101 is generated by superimposing the upper viewpoint images in relation to a plurality of the cameras 60 (in this example, two cameras).

Actually, the image processing unit 35f does not execute the coordinate conversion in two steps, but rather execute direct conversion of the images captured by the two cameras 60 into the plain view image 101 seen from the virtual camera by using the parameters for the coordinate conversion and the image synthesis acquired by the image setting unit 35g described below.

More specifically, the plain view image 101 is generated by a method such as the method disclosed for example in Japanese Patent Application Laid-Open No. 2003-256874. However, there is no limitation in this regard, and various methods may be applied to generate the plain view image 101 based on the images captured by the cameras 60.

(2-6-5-7) Image Setting Unit

The image setting unit 35g derives parameters required for generating the plain view image 101 by the image processing unit 35f during normal operation based on the images captured by the cameras 60 when the cameras 60 are installed or exchanged, for example during initial settings, maintenance or the like. That is to say, the image setting unit 35g performs the initial settings for generating the plain view image 101 by the image processing unit 35f.

The image setting unit 35g includes an information reading unit 35ga and a parameter calculation unit 35gb.

(2-6-5-7-1) Information Reading Unit

The information reading unit 35ga reads out position information of the reference points at a timing when the parameters for generating the plain view image 101 by the image processing unit 35f are derived by the image setting unit 35g. The position information of the reference points read out by the information reading unit 35ga includes three dimensional position information of the reference points stored in the reference point position storage area 34a and two dimensional position information of the reference points in relation to the captured images of the cameras 60 stored in the reference point input storage area 34b.

(2-6-5-7-2) Parameter Calculation Unit

The parameter calculation unit 35gb uses the two types of position information read out by the information reading unit 35ga to calculate parameters required for the generation of the plain view image 101 by the image processing unit 35f.

Since the three dimensional information of the reference points is known as described above, the image capturing position of the cameras 60 can be calculated when it is known how the reference point is viewed in the image captured by the cameras 60. Once the image capturing position of the cameras 60 is calculated, parameters for generation of the plain view image 101 can be derived.

Furthermore, in substitution for actually calculating the parameters, the parameters are prepared with reference to the positions of the cameras 60 and stored in the storing unit 34, and the parameter calculation unit 35gb may read out parameters according to the image capturing positions of the cameras 60 to derive the parameter. In this configuration, the image capturing positions of the cameras 60 are calculated by the parameter calculation unit 35gb.

(2-6-5-8) Output Rotation Unit

The output rotation unit 35h rotates the image output to the touch panel 10.

More specifically, when an image rotation button 156 on the touch panel 10 as described below is pressed, the output rotation unit 35h rotates the plain view image 101 about the centroid of the dispersing table 2 in the plain view image 101. The details of the rotation operation will be described below in the description related to the display of the touch panel 10.

Furthermore, as described below, various types of information related to the heads 40-1~14 (the codes for identification of the heads 40-1~14, the operation status of the dispersing table 2 and each of the radial feeders 3-1~14, the conveyance amount of each of the radial feeders 3-1~14, or the like) is displayed on the touch panel 10. The output rotation unit 35h also rotates that information to correspond to the plain view image 101.

(2-7) Touch Panel

Figure 6:
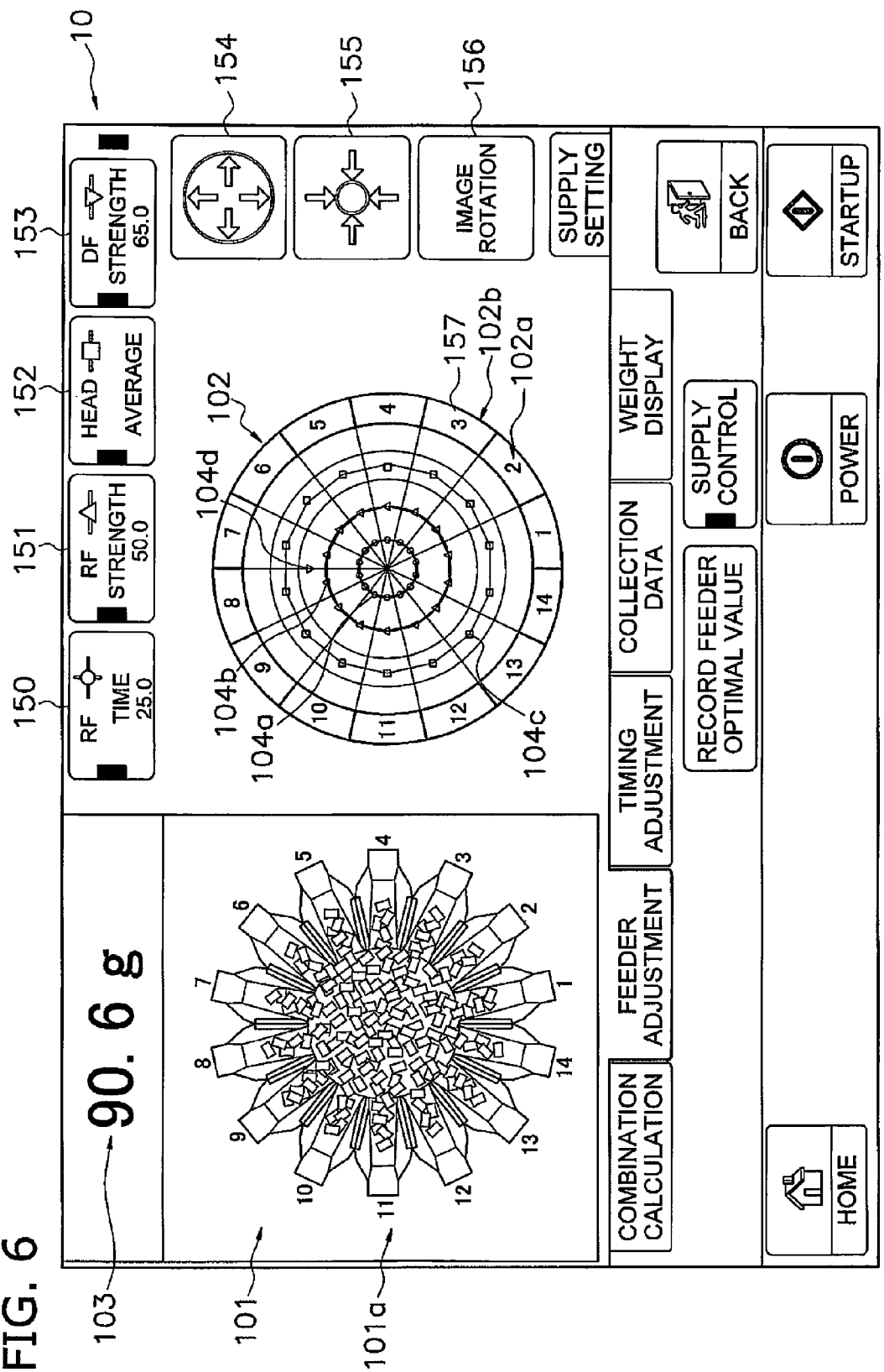
FIG. 6 illustrates an example of displays displayed on a touch panel.

The touch panel 10 is a liquid crystal display (LCD) having functions of both input and output, and therefore can function as both an input unit and an output unit. The touch panel 10 receives inputs such as various settings or the like related to the combination weighing and displays the operating status of the combination weighing device 1. FIG. 6 illustrates an example of a screen displayed on the touch panel 10.

A user performs various types of input to the combination weighing device 1 by pressing a button or the like displayed on the touch panel 10. The information input to the touch panel 10 includes two dimensional position information of the reference point in relation to the captured image of the cameras 60 that is used by the image setting unit 35g. The two dimensional position information of the reference points in relation to the captured image of the camera 60 is an example of the reference point information input from the touch panel 10.

The two dimensional position information of the reference point in relation to the captured image of the cameras 60 is input as described below. The LCD of the touch panel 10 displays an actual image captured by one of the cameras 60 during initial settings or maintenance, as shown in FIG. 4 for example. The Operator uses the touch panel 10 to specify the positions of the reference points (the three corner portions 3-1a, 3-5a, 3-12a of the radial feeders 3 in FIG. 4) in this image. This operation is performed repeatedly to input the positions of at least three reference points for the image captured by one of the cameras 60. The input operation is performed in the same manner for the other camera 60. The two dimensional position information of the reference points in relation to the captured image of the cameras 60, input to the touch panel 10, is stored in the reference point input storage area 34b.

The display and operation of the touch panel 10 will be described below.

(2-8) Camera

The cameras 60 capture images (moving images) of the dispersing table 2 and the radial feeders 3.

Two cameras 60 are disposed in a space which is above the support unit 7 of the combination weighing device 1 (that is to say, the support unit 7 supporting each part of the combination weighing device 1 such as the dispersing table 2, the radial feeders 3, the pool hoppers 4, the weighing hoppers 5, the collection discharge chute 6, the cameras 60, or the like) and at positions other than a space directly above the dispersing table 2, without protruding into a space above the work passage 92.

More specifically, as illustrated in FIG. 1, the cameras 60 are installed at positions that are above the dispersing table 2 and the radial feeders 3 and lower than the article discharge outlet 90a formed in the supply conveyor 90. As illustrated in FIG. 2, the camera 60 are disposed above the support unit 7 of the combination weighing device 1 without protruding into a space above the dispersing table 2 and the heads 40. As illustrated in FIG. 1, the cameras 60 are fixed by a support 7a extending upwardly from the support unit 7. As illustrated in FIG. 2, in plain view, the two cameras 60 are disposed point symmetrically to each other relative to the center of the dispersing table 2. Lenses 60a of the cameras 60 are oriented to the central direction of the dispersing table 2.

The disposition, orientation and number of the cameras 60 are merely exemplary, and there is no limitation in this regard. However, in order to generate the plain view image 101 without partial missing, the cameras 60 are disposed so that the each location across the whole of the dispersing table 2 and the radial feeders 3 is captured by at least any one of the cameras 60. Furthermore, although three or more cameras 60 may be provided, a small number of cameras is preferred in view of installation costs.

The lenses 60a of the cameras 60 are wide angle lenses whose horizontal angle of view are 90 degrees or above. The use of the lenses 60a whose horizontal angle of view are 90 degrees or above makes it possible to obtain the images required for generation of the plain view image with a small number of cameras 60 when the dispersing table 2 and the heads 40 are installed in the space above the support unit 7 of the combination weighing device 1 and at positions that are below the article discharge outlet 90a formed in the supply conveyor 90 (when installed near the dispersing table 2 and the heads 40 being the object of the image capture).

(3) Display and Operation of Touch Panel

The display and operation of the touch panel 10 will be described in particular with reference to details regarding the plain view image 101.

The liquid crystal screen of the touch panel 10 displays the plain view image 101 on the left side and a radar graph 102 on the right side in a screen. Numerals 103 that exhibit the result of the combination calculation are displayed in approximately real time above the plain view image 101. Furthermore, the touch panel 10 displays display/non-display switch buttons 150-153, setting buttons 154, 155, and an image rotation button 156.

(3-1) Plain View Image

The plain view image 101 is a plain view image 101 generated by the image processing unit 35f, and displays the state of the dispersing table 2 and the radial feeders 3 in approximately real time. The numerals 101a that are indicated on the periphery of the plain view image 101 denote the codes to identify the heads 40-1~14 in the plain view image 101, and also denote the codes to identify the radial feeders 3-1~14 and the weighing hoppers 5-1~14.

(3-2) Radar Graph

The radar graph 102 includes fourteen fan-shaped areas 102b that are formed by dividing six circles having different radii disposed in a concentric configuration with straight lines that extend in the radial direction.

The radar graph 102 displays information related to the dispersing table 2, information related to the heads 40-1~14, especially related to the radial feeders 3-1~14. The information related to the radial feeders 3-1~14 is displayed for each of the radial feeders 3-1~14 separately. More specifically, the information related to one of the radial feeders 3-1~14 is displayed in the respective fourteen areas in the same order as the actual radial feeders 3-1~14 (so that the numerals for identification increase from the radial feeder 3-1 in a counterclockwise direction). The numeral 102a between the outermost circle and a circle next to the outermost circle in the area 102b indicates for which head 40-1~14 (for which radial feeder 3-1~14) the area 102b displays the information.

The display of the radar graph 102 will be described in detail below.

The radar graph 102 in FIG. 6 displays the vibration strength and the vibration time of each of the radial feeders 3-1~14 (such information is termed information related to the operation status of each of the radial feeders 3-1~14), the conveyance amount of each of the radial feeders 3-1~14, and the vibration strength of the dispersing table 2 as well as the operation and the stoppage of the dispersing table 2 and each of the radial feeders 3-1~14.

In FIG. 6, the vibration time of each of the radial feeders 3-1~14 is indicated by a round mark 104a, the vibration strength of each of the radial feeders 3-1~14 is indicated by a triangular mark 104b, the conveyance amount of each of the radial feeders 3-1-44 is indicated by a square mark 104c, and the vibration strength of the dispersing table 2 is indicated by an inverted triangular mark 104d. As described above, the vibration time and the vibration strength of each of the radial feeders 3-1~14 and the vibration strength of the dispersing table 2 are information that is stored in the storing unit 34. The vibration time and the vibration strength of each of the radial feeders 3-1~14 and the vibration strength of the dispersing table 2 are initial values or values that is updated by input from the touch panel 10. The conveyance amount is a value calculated by the calculating unit 35b and stored in the storing unit 34. In the radar graph 102, the value increases as the distance along the radial direction from the center of the circle increases.

As shown in FIG. 6, the numeral 101a disposed on the periphery of the plain view image 101 and the numeral 102a disposed in the radar graph 102 are such that the same numeral is described at the same position. For example, the numeral 101a that is positioned in approximately 3 o'clock direction relative to the centroid of the dispersing table 2 in the plain view image 101 is 4, and the numeral 102a that is positioned in approximately 3 o'clock direction relative to the center of the circles in the radar graph 102 is also 4. In other words, the radial feeders 3-1~14 in the plain view image 101 and the information related to the radial feeders 3-1~14 in the radar graph 102 are displayed in a corresponding configuration to enable comprehension of the correspondence at a glance.

The portion of the figure that is displayed in the radar graph 102 has a function of a button to receive the input of the operator. More specifically, the portion between the outermost circle and the circle next to the outermost circle in the area 102b, where the numeral 102a is displayed, functions as a selection button 157 that is used when the operator performs setting related to the radial feeders 3-1~14 corresponding to the numeral 102a. When the operator presses the selection button 157, it enables to perform the setting of the radial feeders 3-1~14 corresponding to the numeral 102a in the pressed selection button 157, more specifically, it enables to perform the setting of the vibration time and the vibration strength of the radial feeders 3-1~14 corresponding to the numeral 102a in the pressed selection button 157. This operation will be described in detail below.

(3-3) Display/Non-Display Switch Button

The display/non-display switch buttons 150-153 are buttons used when the vibration time, the vibration strength and the conveyance amount of each of the radial feeders 3-1~14 and the vibration strength of the dispersing table 2 are respectively displayed in the radar graph 102. When the operator presses each of the display/non-display switch buttons 150-153, the corresponding symbol is displayed on the radar graph 102, and when that display/non-display switch button 150-153 is pressed again, the corresponding symbol is hidden.

(3-4) Setting Button

The setting buttons 154, 155 are buttons used when varying the setting values related to each of the radial feeders 3-1~14 and the dispersing table 2. More specifically, use of the setting buttons 154, 155 enables the setting of the vibration time and vibration strength of each of radial feeders 3-1~14 and the vibration strength of the dispersing table 2.

When the vibration time of each of the radial feeders 3-1~14 is set, firstly, the display/non-display switch button 150 is pressed to display the symbol of the vibration time on the radar graph 102. Next, the selection button 157 with the code corresponding to the head 40-1~14 including the radial feeder 3-1~14 for which the vibration time is varied is pressed to determine the radial feeder 3-1~14 that is the object of the change of the vibration time. Thereafter, the setting button 154 is pressed when the vibration time is increased, and the setting button 155 is pressed when the vibration time is decreased. In this manner, the vibration time of the radial feeder 3-1~14 selected as the object of the change of vibration time can be increased or decreased. The change of the vibration time can be performed at the same time in relation to a plurality of the radial feeders 3-1~14.

The same operation is performed when the vibration strength of the radial feeders 3-1~14 is set.

When the vibration strength of the dispersing table 2 is set, firstly, the display/non-display switch button 153 is pressed to display the symbol of the vibration strength of the dispersing table 2 on the radar graph 102. Next, the setting button 154 is pressed when the vibration strength is increased, and the setting button 155 is pressed when the vibration strength is to be decreased. In this manner, the vibration strength of the dispersing table 2 can be increased or decreased.

For example, when the conveyance amount of articles of a given radial feeder 3-1~14 is confirmed to be less than a predetermined range from the radar graph 102 on the touch panel 10 and when it is determined from the plain view image 101 on the touch panel 10 that the conveyance capacity of the radial feeders 3-1~14 is insufficient, an operation to increase the vibration time and/or the vibration strength of the radial feeders 3-1~14 can be performed from the touch panel 10. Furthermore, the operation result can be confirmed by the plain view image 101 and the radar graph 102 on the touch panel 10.

For example, when it is determined from the plain view image 101 that conveyance capacity of the dispersing table 2 is insufficient, an operation to increase the vibration strength of the dispersing table 2 can be performed from the touch panel 10, and the operation result can be confirmed by the plain view image 101.

(3-5) Image Rotation Button

Figure 7:
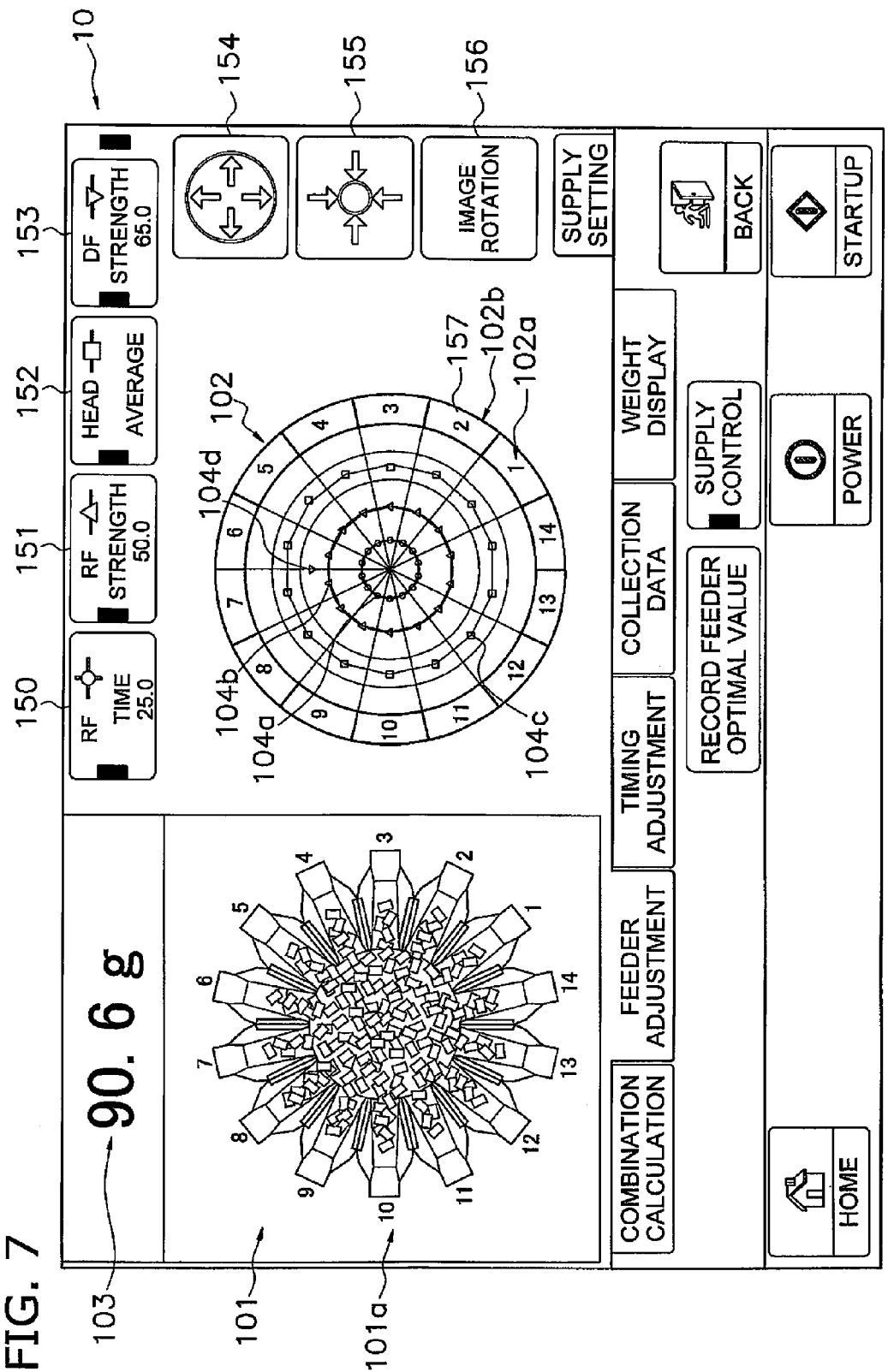
FIG. 7 illustrates a state in which the display that is displayed on the touch panel illustrated in FIG. 6 is modified (rotated) by pressing an image rotation button.

The image rotation button 156 is a button for rotating the display of the plain view image 101 and the radar graph 102. More specifically, the image rotation button 156 is pushed to thereby rotate the plain view image 101 and the radar graph 102 in a counterclockwise direction by an angle corresponding to one of the head 40. That is to say, if the image rotation button 156 is pressed one time, the plain view image 101 image will be rotated in a counterclockwise direction so that the image of the head 40-1 will be displayed on the portion where the image of the head 40-2 is currently displayed, and will be displayed on the touch panel 10. In other words, since the number of the heads 40 in the present embodiment is fourteen, it is rotated in a counterclockwise direction by approximately 25.7 degrees on each time when the image rotation button 156 is pressed. In conjunction with this operation, as illustrated in FIG. 7, the numerals 101a for identification of the head 40 deviate one by one in a counterclockwise direction from the display in FIG. 6. Furthermore, corresponding to this operation, as to the radar graph 102, the display is rotated in a counterclockwise direction. That is to say, as illustrated in FIG. 7, the display is rotated in a counterclockwise direction so that information related to the head 40-1 (the radial feeder 3-1) is displayed in the area 102b where information related to the head 40-2 (radial feeder 3-2) is displayed in FIG. 6, and the numerals 102a are displayed by being deviated one by one in a counterclockwise direction.

However, the inverted triangular mark 104d related to the vibration strength of the dispersing table 2 is not rotated even when the image rotation button 156 is pressed since it makes difficult to recognize it when rotated.

The processing for image rotation is performed by the output rotation unit 35h.

(4) Characteristics of Combination Weighing Apparatus (4-1)

The combination weighing device 1 according to the present embodiment includes the dispersing table 2 as a dispersing unit, the fourteen radial feeders 3-1~14, the two cameras 60, the image processing unit 35f of the control unit 30 as a processing unit, and the touch panel 10 as an output unit. The dispersing table 2 receives a supply of a large number of articles and disperse the articles. The radial feeders 3-1~14 are arranged to extend radially from the dispersing table 2. The radial feeder 3-1~14 receives the articles dispersed by the dispersing table 2 and conveys the articles in directions away from the dispersing table 2. The cameras 60 are disposed at positions other than a space directly above the dispersing table 2 and capture images of the dispersing table 2 and the radial feeders 3-1~14. The image processing unit 35f generate the plain view image 101 of the dispersing table 2 and the radial feeders 3-1~14 by synthesizing the images captured by the cameras 60. The touch panel 10 outputs the plain view image 101.

In this manner, the plain view image 101 of the dispersing table 2 and the radial feeders 3-1~14 in generated and output. Therefore, it is possible for the operator to accurately comprehend the status of the dispersing table 2 and radial feeders 3 even in a case where it is difficult to dispose cameras into a space directly above the dispersing table 2. Consequently, when abnormality occurs, it is easy for the operator to presume the cause of the abnormality based on the plain view image and takes a required response immediately. For example, it is easy to determine whether the abnormality is caused or not by the combination weighing device 1 (for example, whether the articles are supplied or not from the supply conveyor 90), whether the abnormality can be solved by operation on the touch panel 10 or requires an onsite response in such a case that jamming is caused at the radial feeders 3-1~14.

Furthermore, when a dead angle of a camera is generated in an image captured by one of the camera 60 due to obstacles such as the supply conveyor 90 of the articles, the status of the dispersing table 2 and the radial feeders 3 can be comprehended without being affected by the obstacles since the plain view image is generated by synthesizing the images captured by a plurality (two) of the cameras 60.

(4-2)

The combination weighing device 1 according to the present embodiment further includes the image setting unit 35g as a setting unit. The image setting unit 35g performs settings, based on the images captured by the cameras 60 during initial settings, during maintenance, or the like, for generation of the plain view image 101 with the images captured by the cameras 60 by the image processing unit 35f during normal operation (in the second period)

That is to say, the image setting unit 35g performs settings for generation of the plain view image 101 based on the images captured by the cameras 60 during initial settings, during maintenance or the like (in the first period). That is to say, even when the positions of the cameras 60 are changed, the plain view image can be generated based on the image of the cameras 60 captured at those positions in the first period. As a result, the installation positions of the cameras 60 can be varied according to the site conditions. That is to say, even when there is a restriction on the installation positions of the cameras 60, the plain view image of the dispersing table 2 and the radial feeders 3 can be easily obtained.

(4-3)

The combination weighing device 1 according to the present embodiment further includes the touch panel 10 as an input unit. The image setting unit 35g performs the settings based on the two dimensional position information (reference point information) in relation to the captured image of the cameras 60, that is input to the touch panel 10 and stored in the reference point input storage area 34b.

In this manner, the settings for generating the plain view image can be accurately executed. As a result, an accurate plain view image can be easily obtained.

(4-4)

In the combination weighing device 1 according to the present embodiment, the touch panel 10 outputs the operational status of the dispersing table 2 and the radial feeders 3-1~14 by the radar graph 102 at the same time as the plain view image 101.

In this manner, it is possible to confirm whether the dispersing table 2 and the radial feeders 3-1~14 are operated suitably in a single screen. As a result, for example, when abnormality occurs, it is easy for the operator to determine an appropriate measures to solve that.

(4-5)

Furthermore, the touch panel 10 outputs the operational status of the dispersing table 2 and the radial feeders 3-1~14 at positions corresponding to the dispersing table 2 and each of the radial feeders 3-1~14. That is to say, the plain view image 101 and the radar graph 102 are outputted so as to be correspond to each other.

In this manner, the plain view image 101 and the operational status of each of the radial feeders 3-1~14 can be easily comprehended in association with each other, and therefore convenience of the operator is improved.

(4-6)

The combination weighing device 1 according to the present embodiment further includes a plurality of the weighing hoppers 5-1~14 being as a plurality of weighing units, and the calculating unit 35b. The weighing hoppers 5-1~14 are respectively disposed below the end portion on the forward side of the outer edge of the radial feeders 3-1~14 (in the direction away the dispersing table 2). The weighing hoppers 5-1~14 receives the articles from the radial feeders 3-1~14 via the pool hoppers 4-1~14 and weigh the received article. The calculating unit 35b calculates the conveyance amount by each of the radial feeders 3-1~14 based on the weighing result of the weighing hoppers 5-1~14. The touch panel 10 outputs the calculation result of the calculating unit 35b at the same time as the plain view image 101.

In this manner, operators can easily comprehend the plain view image 101 and the conveyance amount of the radial feeders 3-1~14 the association with each other. As a result, for example, when abnormality occurs, it is easy for the operators to determine appropriate measures to solve that.

Furthermore, the following measure is possible based on the plain view image 101 and the conveyance amounts of the radial feeders 3-1~14 displayed on the touch panel 10.

When the conveyance amount of a given head 40-1~14 is small, the radial feeder 3-1~14 of that head 40-1~14 is checked on the plain view image 101. If there are sufficient articles on that radial feeder 3-1~14, the vibration strength or the vibration time is increased in relation to that radial feeder 3-1~14. On the other hand, if there are only a small amount of articles on that radial feeder 3-1~14, the vibration time or vibration strength of the dispersing table 2 is increased, or the amount of articles loaded on the dispersing table 2 is increased since it can be determined that the supply of articles from the dispersing table 2 to that radial feeders 3-1~14 is insufficient. That is to say, a suitable measure can be easily selected.

(4-7)

Furthermore, the touch panel 10 outputs the calculation result of the conveyance amount related to each of the radial feeders 3-1~14 at a position corresponding to each of the radial feeders 3-1~14 in the plain view image 101.

In this manner, convenience of the operator is improved since it is easier to comprehend the plain view image 101 and the conveyance amount of the radial feeder 3-1~14 in association with each other.

(4-8)

In the combination weighing device 1 according to the present embodiment, a code enabling identification of each of the radial feeders 3-1~14 is respectively applied to the radial feeders 3-1~14. The touch panel 10 outputs the code at the same time as the plain view image 101 at the position corresponding to each of the radial feeders 3-1~14 in the plain view image 101

In this manner, it is possible to comprehend accurately which radial feeder 3-1~14 has a problem from the plain view image 101.

(4-9)

In the combination weighing device 1 according to the present embodiment, the touch panel 10 outputs the plain view image 101 rotated in-plane around the rotational center being the centroid of the dispersing table 2 in the plain view image 101.

In this manner, the operator can rotate the plain view image 101 and output it in a configuration that is most easily comprehended. As a result, erroneous comprehension of the plain view image 101 by the operator can be prevented.

(4-10)

The combination weighing device 1 according to the present invention further includes a support unit 7. The support unit 7 supports the dispersing table 2, the radial feeders 3-1~14 and the cameras 60. The cameras 60 are disposed above the support unit 7 and at positions other than directly above the radial feeders 3-1~14.

In this context, the cameras 60 do not obstruct works or passage of the operator. Even when the work passage 92 for the operator is disposed on the periphery of the combination weighing device 1, the disposition of the cameras 60 above the support unit 7 of the combination weighing device 1 makes little effect on the works or passage of the operator. Furthermore, accidents such as the operator being injured by collision with the cameras 60 can be prevented.

(4-11)

In the combination weighing device 1 according to the present invention, the cameras 60 have a lens 60a having a horizontal angle of view of at least 90 degrees.

In this manner, even when the cameras 60 are disposed in proximity to the object to be imaged (above the support unit 7 of the combination weighing device 1), the images required for generating the plain view image 101 of the dispersing table 2 and the radial feeders 3-1~14 can be obtained with a small number of cameras 60 (two cameras in the present embodiment), and therefore the installation costs associated with the cameras 60 can be suppressed.

(5) Modified Example (5-1) Modified Example A

Figure 8:
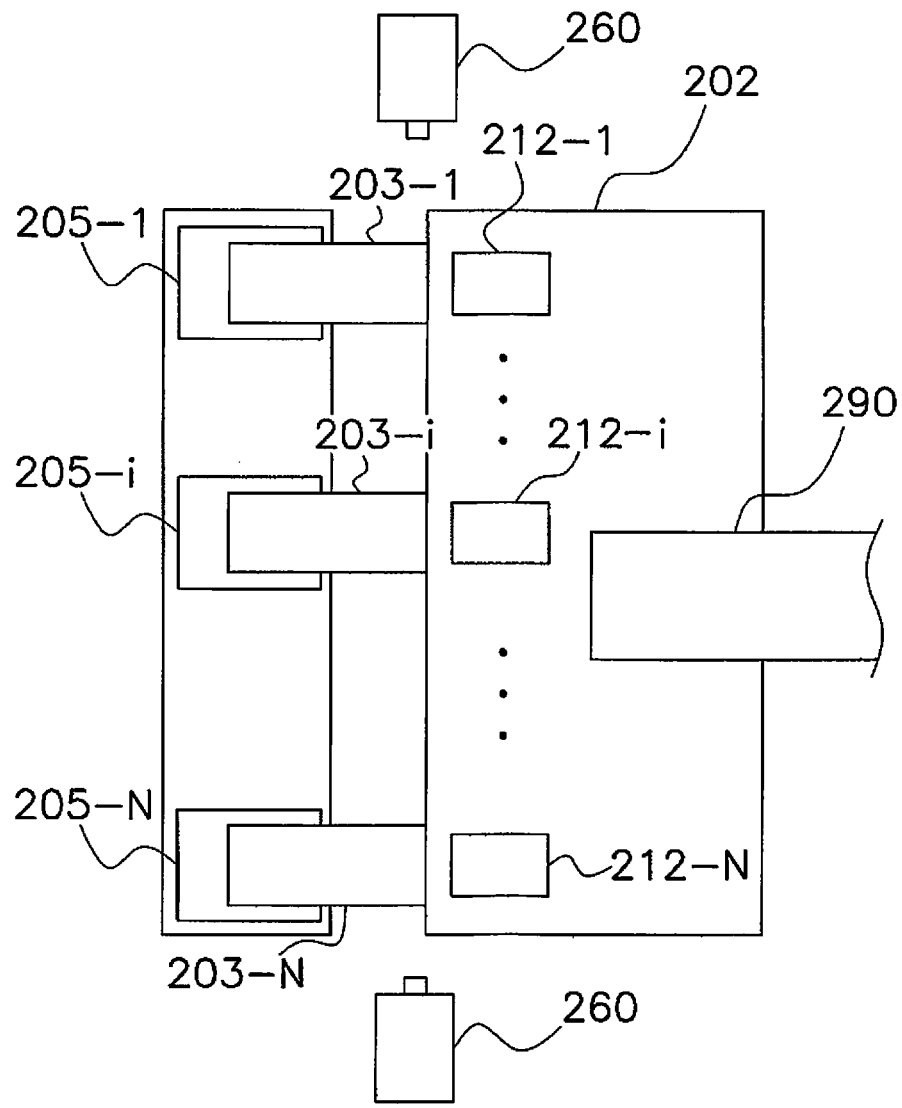
FIG. 8 is a schematic plain view of a linear-type combination weighing device.

The combination weighing device 1 according to the above embodiment is described as a configuration having a circular shape in which fourteen weighing hoppers 5 are arranged annularly below radial feeders 3 extending radially as illustrated in FIG. 1. However, the present invention can also be applied to a linear-type combination weighing device as illustrated in the plain view in FIG. 8. In FIG. 8, a carrying conveyor 290 drops articles being weighed into a supply hopper 202 (dispersing unit) that has N sets of supply holes 212-i. The articles are put into the weighing hoppers 205-i disposed in a linear configuration via drive feeders 203-i respectively corresponding to the supply holes 212-i. In this configuration, for example, when cameras 260 are installed at positions illustrated in FIG. 8, a plain view image is generated based on the captured images and the plain view image is outputted on an output unit such as a touch panel, the operator can easily comprehend the status of the supply hopper 202 and the drive feeders 203-i. The disposition, orientation and number of the cameras 260 are merely exemplary, and there is no limitation in this regard.

(5-2) Modified Example B

In the combination weighing device 1 according to the above embodiment, touch panel 10 displays information related to the dispersing table 2 and the radial feeders 3-1~14 at the same time as the plain view image. However, there is no limitation in this regard.

For example, a combination of heads 40-1~14 (weighing hoppers 5-1~14) selected by the combination calculation unit 35c may be displayed at the same time as the plain view image 101. For example, the selection in the combination is indicated in the radar graph 102 by a method of changing a color or the like of the area 102b corresponding to the heads 40-1~14 selected in the combination by the combination calculation unit 35c.

Furthermore, selection rates (probabilities to be selected in the combination) of the heads 40-1~14 (weighing hoppers 5-1~14) by the combination calculation unit 35c may be displayed in the radar graph 102 at the same time as the plain view image 101.

In this configuration, it is possible to comprehend the plain view image 101 and the operational state of the combination weighing device 1 in association with each other, and thereby it is valuable for the operator to determine a measure when abnormality occurs.

(5-3) Modified Example C

In the combination weighing device 1 according to the above embodiment, the touch panel 10 displays the plain view image 101 and the radar graph 102 side by side, but there is no limitation in this regard. For example, the plain view image 101 and the radar graph 102 may be superimposed in the display. This further facilitates the comprehension of the visually-acquired information and the quantitative information in association with each other.

(5-4) Modified Example D

In the combination weighing device 1 according to the above embodiment, the touch panel 10 displays the vibration time, the vibration strength and the conveyance amount of the radial feeders 3-1~14 by a radar graph 102. However, there is no limitation in this regard, and such information may be displayed numerically.

(5-5) Modified Example E

In the combination weighing device 1 according to the above embodiment, the vibration time, the vibration strength and the conveyance amount of the radial feeders 3-1~14 and the vibration strength of the dispersing table 2 are displayed in the radar graph 102 of the touch panel 10. However, there is no limitation in this regard, and the vibration time of the dispersing table 2 may be displayed, for example.

In this case, the vibration time of the dispersing table 2 may be varied by input from the touch panel 10.

(5-6) Modified Example F

In the combination weighing device 1 according to the above embodiment, the image setting unit 35g derives the parameters for generating the plain image 101 by the image processing unit 35f based on the reference point information input to the touch panel 10. However, there is no limitation in this regard.

For example, the image setting unit 35g may identify the positions of the reference points automatically in the images captured by the cameras 60 and may derive the parameters to generate the plain view image 101 for the image processing unit 35f.

The invention claimed is:

1. A combination weighing device comprising:
   a dispersing unit configured to receive a supply of a large number of articles and configured to disperse the articles;
   a plurality of radial feeders arranged to extend radially from the dispersing unit, the radial feeder being configured to receive the articles dispersed by the dispersing unit and convey the articles in a direction away from the dispersing unit;
   a plurality of cameras configured to capture images of the dispersing unit and the radial feeders;
   a processing unit configured to generate a plain view image looking down upon the dispersing unit and the radial feeders by synthesizing the images captured by the plurality of cameras; and
   an output unit configured to output the plain view image.

2. The combination weighing device according to claim 1, further comprising
   a setting unit,
   wherein the setting unit performs settings, based on the images captured by the cameras in a first period, for generation of the plain view image with the images captured by the cameras by the processing unit in a second period.

3. The combination weighing device according to claim 2, further comprising
   an input unit,
   wherein the setting unit performs the settings based on reference point information input to the input unit.

4. The combination weighing device according to claim 1, wherein
   the output unit outputs operational status of the dispersing unit and/or the radial feeders at the same time as the plain view image.

5. The combination weighing device according to claim 4, wherein
   the output unit outputs the operational status of the dispersing unit and/or each of the radial feeders at a position corresponding to the dispersing unit and/or each of the radial feeders in the plain view image.

6. The combination weighing device according to claim 1, further comprising:
   a plurality of weighing units that are disposed respectively below an end portion on a forward side of the radial feeders in the direction away from the dispersing unit, the weighing units receiving the articles from the radial feeders and weighing the received article; and
   a calculating unit calculating a conveyance amount by each of the radial feeders based on a weighing result of the weighing units,
   wherein the output unit outputs a calculation result of the calculation unit at the same time as the plain view image.

7. The combination weighing device according to claim 6, wherein
   the output unit outputs the calculation result related to each of the radial feeders at a position corresponding to each of the radial feeders in the plain view image.

8. The combination weighing device according to claim 1, wherein
   a code enabling identification of each of the radial feeders is respectively applied to the radial feeders,
   the output unit outputs the code at the same time as the plain view image at a position corresponding to each of the radial feeders in the plain view image.

9. The combination weighing device according to claim 1, wherein
   the output unit outputs the plain view image rotated in-plane around a rotation center being a centroid of the dispersing unit in the plain view image.

10. The combination weighing device according to claim 1, further comprising,
    a support unit supporting the dispersing unit, the radial feeders and the cameras,
    wherein the cameras are disposed above the support unit and at positions other than a space directly above the radial feeders.

11. The combination weighing device according to claim 10, wherein
    the cameras have a lens having a horizontal angle of view of at least 90 degrees.

12. The combination weighing device according to claim 1, wherein
    the cameras are disposed at positions other than a space directly above the dispersing unit.

13. The combination weighing device according to claim 12, further comprising
    a setting unit,
    wherein the setting unit performs settings, based on the images captured by the cameras in a first period, for generation of the plain view image with the images captured by the cameras by the processing unit in a second period.

14. The combination weighing device according to claim 1, wherein
    the cameras are disposed at opposite lateral sides of the dispersing unit and above the dispersing unit.

15. The combination weighing device according to claim 14, further comprising
a setting unit,
wherein the setting unit performs settings, based on the images captured by the cameras in a first period, for generation of the plain view image with the images captured by the cameras by the processing unit in a second period.

* * * * *